(12) United States Patent
Arens et al.

(10) Patent No.: US 9,710,477 B2
(45) Date of Patent: Jul. 18, 2017

(54) METHOD FOR FILE SYSTEM MANAGEMENT AND ASSOCIATED DATA STRUCTURE

(71) Applicant: Connect Software B.V., Noordwijk (NL)

(72) Inventors: Michiel Anton Marinus Arens, Noordwijk (NL); Johan Willem Goossen, Utrecht (NL); Rudolf Jacobus Nicolaas Duivenvoorden, Noordwijkerhout (NL)

(73) Assignee: CONNECT SOFTWARE B.V., Noordwijk (NL)

( * ) Notice: Subject to any disclaimer, the term of this patent is extended or adjusted under 35 U.S.C. 154(b) by 260 days.

(21) Appl. No.: 14/515,756

(22) Filed: Oct. 16, 2014

(65) Prior Publication Data

US 2016/0110379 A1    Apr. 21, 2016

(51) Int. Cl.
*G06F 17/30* (2006.01)

(52) U.S. Cl.
CPC .............................. *G06F 17/30091* (2013.01)

(58) Field of Classification Search
CPC .... G06F 17/00; G06F 17/30; G06F 17/30067; G06F 17/30091
USPC .................................................. 707/600–899
See application file for complete search history.

(56) References Cited

U.S. PATENT DOCUMENTS

2013/0226888 A1* 8/2013 Govind ............ G06F 17/30132
707/698

* cited by examiner

*Primary Examiner* — Isaac M Woo
(74) *Attorney, Agent, or Firm* — Young & Thompson

(57) ABSTRACT

Data structure that is associated with an hierarchical file system of a computational system. The hierarchical file system includes a set of files arranged in a directory structure including a set of directories. The data structure includes a data store with a set of reference data objects (topics) and a set of coupling data elements. The set of coupling data elements includes at least: one coupling data element for coupling a first item selected from either the set of reference data objects or the set of files or the set of directories with a second item from either the set of reference data objects or the set of files or the set of directories.

33 Claims, 4 Drawing Sheets

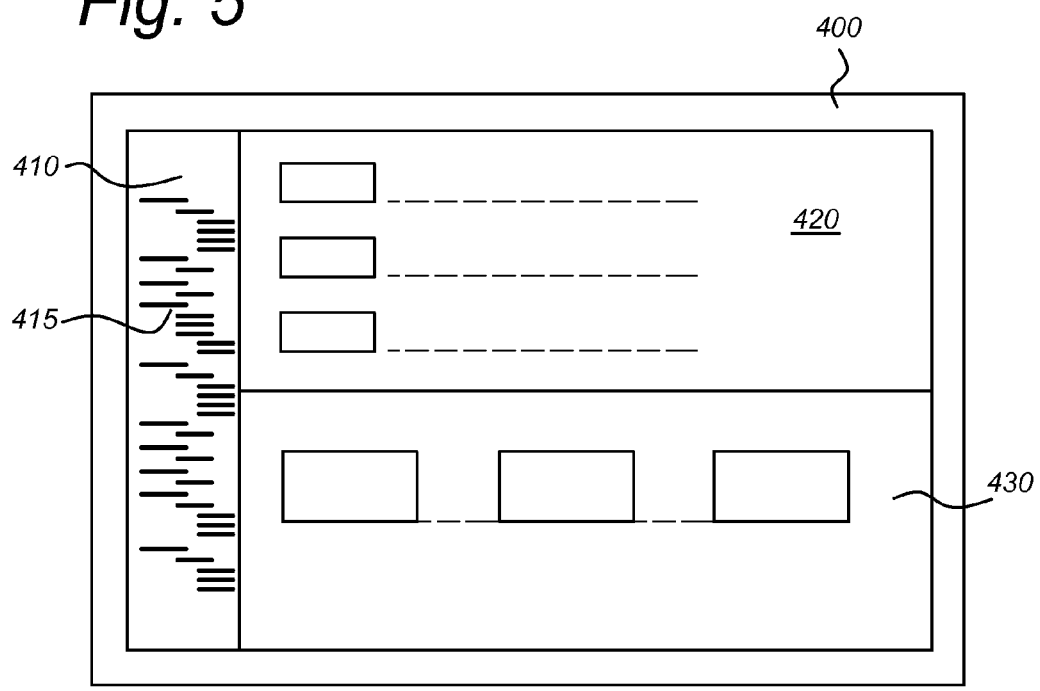

METHOD FOR FILE SYSTEM MANAGEMENT AND ASSOCIATED DATA STRUCTURE

FIELD OF THE INVENTION

The present invention relates to a method for management of an electronic hierarchical file system. Also, the present invention relates to a data structure for said file system. In addition, the present invention relates to a computer program and to computer readable media holding such a computer program.

BACKGROUND

From the prior art computer operating systems are known that use electronic file systems for storage of data.

The computer operating system runs on a computer system that comprises one or more processing units, memory and one or more electronic storage units.

On the electronic storage units, a user can store information in the form of data files. Such information may comprise word processing documents, spreadsheets, presentations, multi-media files, etc.

The operating system provides an hierarchical file structure to the electronic storage with nested folders that each can hold one or more data files. Such a file structure may be referred to as a branched tree structure.

Typically, the operating system allows the user to create a folder structure and place data files within the hierarchical folder structure, using substantially his own naming conventions. In this manner, the user can build a file archive which the user can navigate in relatively simple manner. Documents and/or data that have a mutual relationship are typically placed in one folder or within a same branch of the tree structure.

However, the relationship between documents that are not placed together in a manner logical to the user, may be difficult to retrieve and/or to overview.

Also, updating of this relationship when documents are changed, or replaced may be time-consuming.

SUMMARY

It is an object of the invention to overcome one or more of the disadvantages from the prior art.

The object is achieved by a data structure associated with an hierarchical file system of a computational system, the hierarchical file system comprising a set of files arranged in a directory structure comprising a set of directories; the data structure comprising a data store; the data store comprising a set of reference data objects (topics) and a set of coupling data elements, wherein the set of coupling data elements comprise at least: one coupling data element for coupling a first item selected from either the set of reference data objects or the set of files or the set of directories with a second item from either the set of reference data objects or the set of files or the set of directories.

Accordingly, the coupling data elements provided by the data structure allows a user to create relationships or connections between various data in the file system, irrespective of their type and location in the file system as perceived from the user level.

The data structure allows to create multiple coupling data elements for a specific item, and thus to create a plurality of connections for that specific item.

In an aspect the invention relates to a data structure, wherein the coupling data element comprises a first pointer to the first item and a second pointer to the second item.

Advantageously, this data structure allows to set up "bidirectional" connections that allow the user to view the connection between two items from either of the first and second items which simplifies to recognize the connection.

Moreover, the data structure allows that a connection can be created between two items, be it between two files, between two folders, between a file and a folder, and also between a file or folder and a reference data object, or even between two reference data objects:

In an aspect the invention relates to a data structure, wherein the first item is a reference data object selected from the set of reference data objects and the second item is a file selected from the directory structure, or the first item is a reference data object selected from the set of reference data objects and the second item is a directory selected from the set of directories in the directory structure.

Such a reference data object is a data element that contains any type of reference information that may be relevant to the user.

As a non-limiting example the reference data object can be a name, an address or location, a code, etc.

In an aspect the invention relates to a data structure, wherein the first item is a reference data object selected from the set of reference data objects, a the second item is another reference data object selected from the set of reference data objects file selected from the directory structure.

In an aspect the invention relates to a data structure, wherein the first item is a file selected from the directory structure, and the second item is another file selected from the directory structure.

In an aspect the invention relates to a data structure, wherein the first item is a directory selected from the directory structure, and the second item is another directory selected from the directory structure.

In an aspect the invention relates to a data structure, wherein the first item is a file selected from the directory structure, and the second item is a directory selected from the directory structure.

In addition, the present invention relates to a method for management of content of an electronic hierarchic file system of a computational system,
the hierarchical file system comprising a set of files arranged in a directory structure comprising a set of directories;
the method comprising:
holding in a data store, data comprising a set of one or more reference data objects (topics) and a set of coupling data elements;
coupling a first item selected from either the set of reference data objects or the set of files or the set of directories with a second item selected from either the set of reference data objects or the set of files or the set of directories;
storing a coupling data element of the first item and the second item in the data store.

In an aspect the invention relates to a method that further comprises: creating displayable information comprising the first item and the second item of at least one coupling data element.

According to the invention, the displayable information is provided to the user in an interface.

In an aspect the invention relates to a method, wherein the displayable information comprises GUI objects of the first item and the second item that can be displayed on a computer screen using a user interaction interface.

According to the invention, the displayable information is provided to the user in graphical user interface that allows manipulation of the information by computer peripheral tools such a mouse pointer, touchpad or keyboard to control of the graphical user interface.

In an aspect the invention relates to a method that comprises displaying the GUI objects in a data window of a file browser program, displaying a representation of the first item and a representation of the second item.

The method provides an extension to the functionality of file browser programs that typically provide a graphical interface to the file system and associated operations. The extension may be embodied as a graphical display that displays information on the coupling data elements, more in particular the first and second items, their content and their connection.

In an aspect the invention relates to a method that comprises a navigation of the file system by selecting either the first or the second item using the user interaction interface.

According to the invention, in a graphical representation of the structure of the file system, the user may be directed to the location of the first or second item in the file system structure by selecting said item with the peripheral tool.

In an aspect the invention relates to a method that comprises displaying a reference to the second item when the first item is selected in the navigation and comprising displaying a reference to the first item when the second item is selected in the navigation, such that the navigation is bidirectional from the first item to the second item and from the second item to the first item.

According to the invention, the navigation using the user interaction interface can be performed in a file browser application. Alternatively, the navigation using the user interaction interface can be performed in any application which is configured to access the file system or information from the file system.

According to the invention, in a graphical representation of the structure of the file system, the user may be provided with information on a second item connected with the first item while the user selects, or points at, the first item. In this manner the connection between first and second items can be visualized to the user and allows a direct movement from the location of one of the items to the other item in the connection.

In an aspect the invention relates to a method that comprises replacing in the coupling data element either the first or the second item with a third item, the third item being one selected from either the set of reference data objects or the set of files or the set of directories.

According to the invention, the first and second items in each coupling data element in the data store can be adapted to modify the connection between items. This feature allows for example to replace a name of a first contact person as reference data object that is linked to for example a file with the name of a second contact person.

In an aspect the invention relates to a method that comprises if the first item or the second item is a reference data object, editing the content of the respective first or second item.

In an aspect the invention relates to a method that comprises if the first item is a reference data object and the second item is a file, a referring link to the first item is embedded in the content of the second item.

According to the invention, to embed a referring link to first item in the second item has the advantage that information of the first item becomes available in the second item.

In an aspect the invention relates to a method, wherein the referring link is a displayable object on a page of the first object.

In various document types this allows to display and embed the information of the first item, in particular of a reference data object as content in the second item.

In an aspect the invention relates to a method, wherein the referring link is a text item, if the first object is a text document, or the referring link is a cell element, if the first object is a spreadsheet file, or the referring link is a diagram or vector graphics object, if the first object is a diagramming and vector graphics application file, or the referring link is a presentation sheet object, if the first object is a presentation file.

According to the invention this provides that information of the first item is embedded as information in any one of a text document, a spreadsheet document, a (flow) diagram or a presentation document or chart document.

Additionally, the present invention relates to a computer program for execution on a computer system, the computer system comprising a processing unit and memory connected to the processing unit, the computer system being arranged with an electronic hierarchic file system of a computational system, the hierarchical file system comprising a set of files arranged in a directory structure comprising a set of directories;

the computer program consisting of a set of instructions, executable by the processing unit wherein the set of instructions after being loaded in the memory allows the processing unit to carry out:

holding in a data store, data comprising a set of one or more reference data objects (topics) and a set of coupling data elements;

further comprising:

coupling a first item selected from either the set of reference data objects or the set of files or the set of directories with a second item from either the set of reference data objects or the set of files or the set of directories;

storing a coupling data element of the first item and the second item in the data store.

According to an aspect, the invention relates to a computer program as described above, wherein the computer program is a component of an operating system of the computer system.

According to an aspect, the invention relates to a computer program as described above, wherein the set of instructions of the computer program are incorporated in the instruction set of a computer application selected from a group comprising a word processing application, a spreadsheet application, a diagramming and vector graphics application, a presentation application and a file browser application.

According to an aspect, the invention relates to a computer program as described above, wherein the computer program is a functional extension of a computer application selected from a group comprising a word processing application, a spreadsheet application, a diagramming and vector graphics application, a presentation application and a file browser application.

The invention may be provided as a plug-in for a computer application, or as external program or sub-routine.

Advantageous embodiments are further defined by the dependent claims.

BRIEF DESCRIPTION OF DRAWINGS

The invention will be explained in more detail below with reference to drawings in which illustrative embodiments of the invention are shown. It will be appreciated by the person skilled in the art that other alternative and equivalent embodiments of the invention can be conceived and reduced to practice without departing from the true spirit of the invention, the scope of the invention being limited only by the appended claims.

In the drawings, FIG. 1 schematically shows an embodiment of a computer system capable of executing the method of the invention;

FIG. 5 shows schematically a GUI displaying the data structure in accordance with an embodiment of the invention

DESCRIPTION OF EMBODIMENTS

Figure 1:
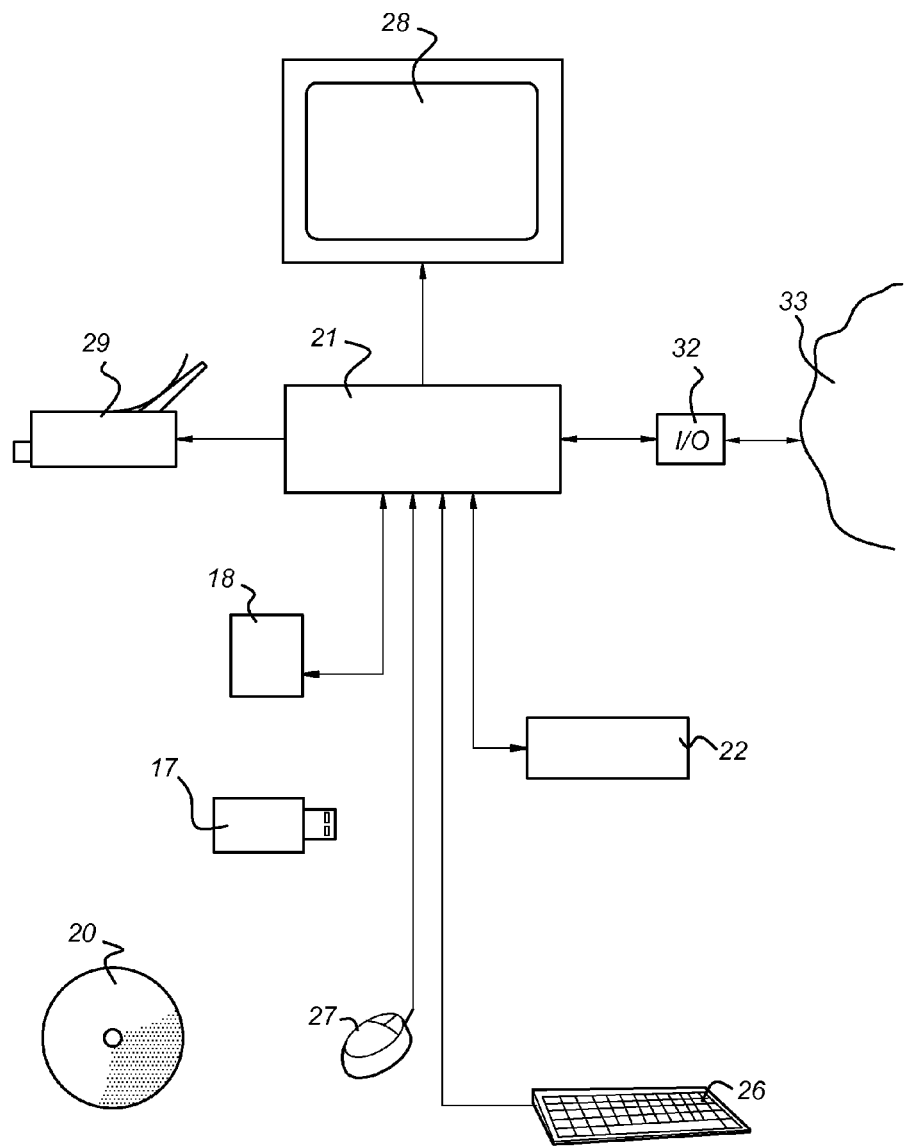

FIG. 1 schematically shows an embodiment of a computer system capable of executing the method of the invention.

The computer system 8 comprises a host processor 21 with peripherals. The host processor 21 is connected to one or more memory units 22 which store instructions and data, one or more file system units 18 that are arranged for storage of electronic data files, a keyboard 26 and a mouse 27 as input devices, and as output devices, a monitor 28 and a printer 29. Other input devices, like a trackball, a touch pad or a touch screen or a scanner, as well as other output devices may be provided.

The computer system may comprise an input/output (I/O) interface 32 for a connection to a network 33 for datacommunication over the network 33.

The memory units for storing instructions and data may comprise RAM 22, (E)EPROM 23, ROM 24. However, it should be understood that there may be provided more and/or other memory units known to persons skilled in the art.

The file system units 22 may comprise hard disks, solid state drives, remote "cloud" storage as will be appreciated by the skilled in the art. One or more of the file system units may be physically located remote from the processor 21, if required.

Additionally, the present invention may be embodied as a computer program comprising instructions and data that allow the processor 21 to execute a method in accordance with the present invention. Such a computer program may be stored on a file system unit or on a computer readable medium such as a CD, DVD 20 or a solid state memory 17, e.g. a memory stick.

The processor 21 is shown as one box, however, it may comprise several processing units functioning in parallel or controlled by one main processor, that may be located remotely from one another, as is known to persons skilled in the art.

Figure 2:
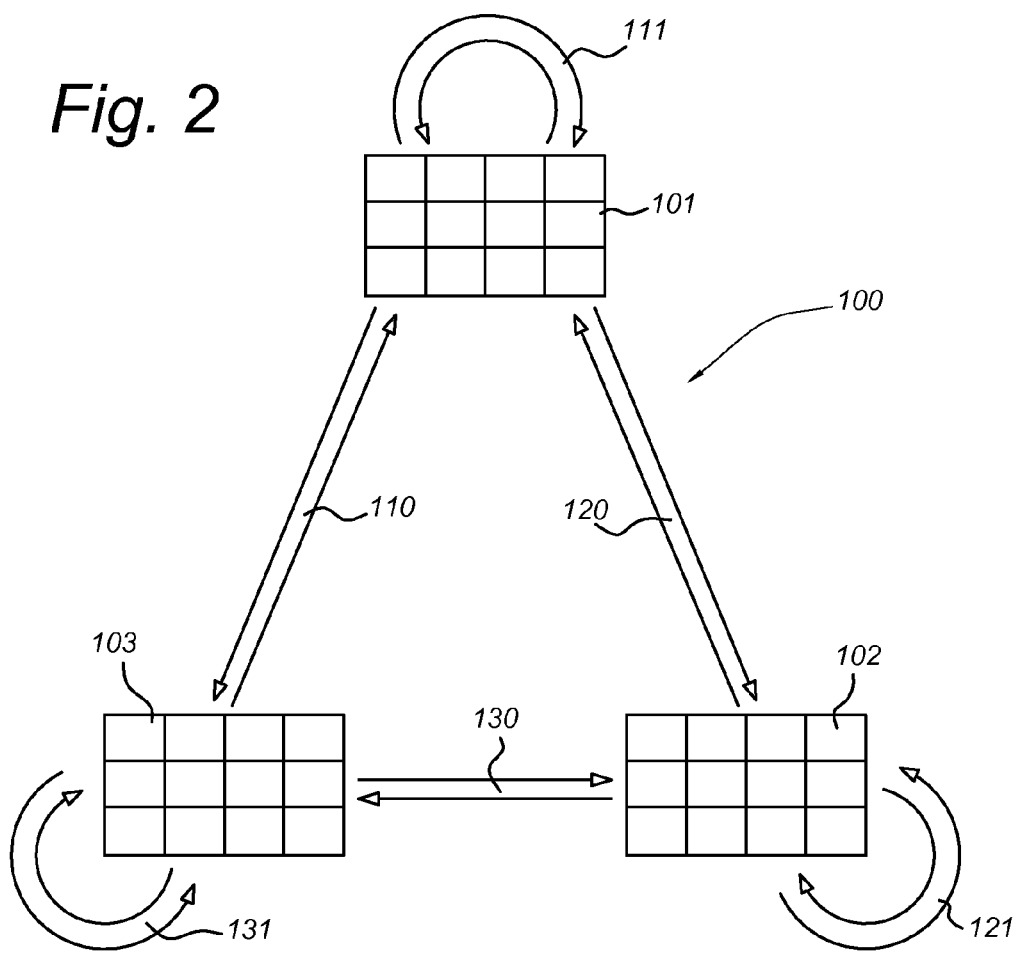
FIG. 2 shows schematically a logical layout of a data structure in accordance with an embodiment of the invention.

FIG. 2 shows schematically a logical layout of a data structure 100 in accordance with an embodiment of the invention.

According to the invention a data structure is created in the computer system that allows to define relationships or connections 110, 111, 120, 121, 130, 131 between items comprising various elements 101, 102, 103 in a hierarchical file system of the computer, for example between two files 103, two folders 102 or between a file 103 and a folder 102. Also, the data structure provides a further item 101 that comprises an additional data element which is a reference data object, that allows to define higher level connections 110, 111, 120 between such a reference data object and an element in the file system (i.e. a folder or file or another reference data object) than formerly known in the prior art.

By adding reference data objects an extra layer of information becomes available to describe connections between files and/or folders that need not be logically grouped, i.e., not in a same branch of the file system.

Advantageously, the data structure 100 provides a coordinating layer of information to items 101, 102, 103 in the file system, irrespective of their type and location in the file system as perceived from the user level.

FIG. 2 shows the connections 110, 111, 120, 121, 130, 131 that can be defined between the various data.

A connection can be defined between any two item types as explained above i.e., a connection 131 between two files 103, a connection 121 between two folders 102, a connection 130 between a file 103 and a folder 102, a connection 111 between two reference data objects 101, a connection 120 between a reference data object 101 and a folder 102 or a connection 110 between a reference data object 101 and a file 103.

The data structure 100 may be arranged as a data store in which coupling elements are stored that each hold a connection 110, 111, 120, 121, 130, 131. The data store will be explained below in more detail.

By using a data store, the data structure 100 can be added to an existing file system, without the need to modify the file system, for example by implementing an extension of routines of the operating system that controls the file system. Such an extension may be a plug-in structure or a program that is arranged to call system functions. It should however be noted that the invention is not limited to this embodiment.

The skilled in the art will of course appreciate that the data store could be implemented as a component of the operating system or the file system.

According to the invention, the data store is configured such that a connection is accessible from either side of the connection, i.e., from any of the two items 101, 102, 103 in the connection. The connections are set-up to be bidirectional: e.g., if a connection 131 exists between a specific file A and a specific second file B, then in the data store this connection can be retrieved from file A to file B and from file B to file A.

Also, this allows a user to view the connection between two items A, B starting from either item A or item B which simplifies to recognize the connection.

The data structure 100 is configured in a manner that a specific item can be connected to multiple different other items. Thus the data structure 100 according to invention allows to create a plurality of connections for that specific item.

Figure 3A:
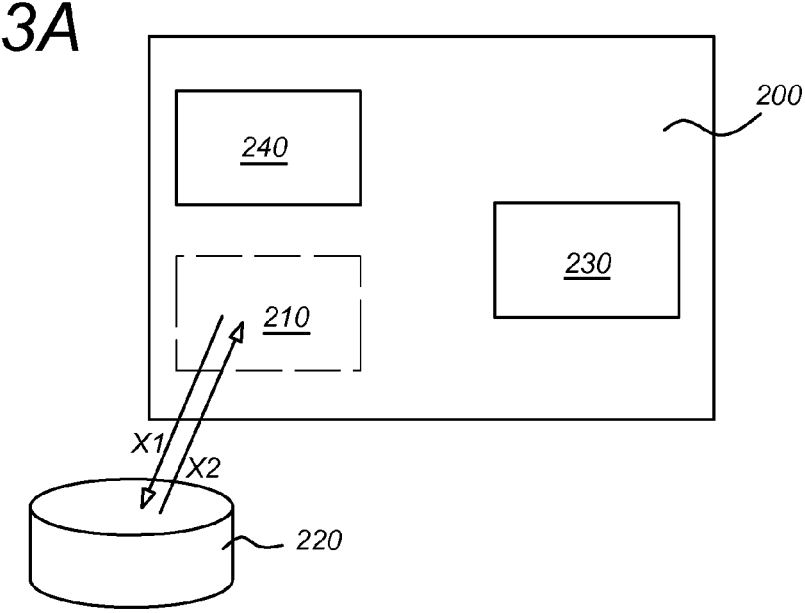
FIGS. 3a, 3b shows schematically a memory arrangement of a data structure according to an embodiment of the invention.
Figure 3B:
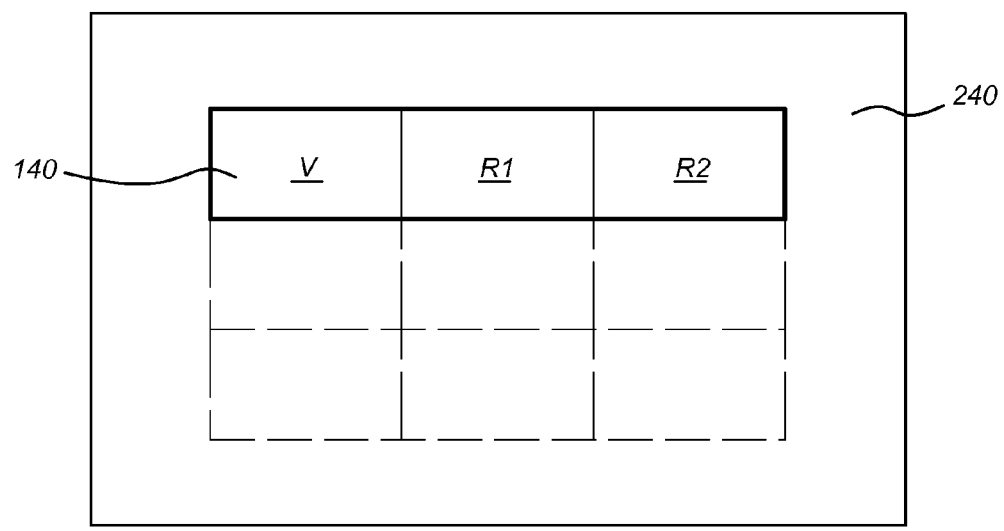

FIGS. 3a, 3b shows schematically a memory arrangement of a data structure 100 according to an embodiment of the invention.

In FIG. 3a a schematic arrangement of the data structure 100 in the memory 200 of the computer system is shown.

In the memory 200, file system data 210 are located that relate to the (tree) structure of the file system 220. The file system data 210 are depicted by the dashed-lined block which is linked to the file system 220 (indicated by the arrows X1, X2).

Further the memory comprises reference data objects or representations thereof, as indicated schematically by block 230.

In addition the memory comprises the data store (i.e. the data structure 100) as indicated by block 240, which holds the information on the connections 110, 111, 120, 121, 130, 131 between items 102, 103 of the file system 220 and items 101 of the reference data objects.

The reference data objects and the connections are preferably stored separately from each other in separate memory or storage blocks.

FIG. 3*b* shows schematically an embodiment of a connection indicated as a data coupling element by block 140 as stored in the data store 240. The connection 140 relates to the relationship between a first item (either reference data object, or file or folder, indicated as R1) and a second item (either reference data object, or file or folder, indicated as R2)

The data store is configured to contain a plurality of connections represented by a plurality of coupling data elements.

Each of the connections is represented in the data store by a coupling data element 140 which may be a data array that comprises a first pointer R1 to the first item and a second pointer R2 to the second item. Further the coupling data element may comprise an identification variable V, and any other relevant data variable, as will be appreciated by the skilled in the art.

From the first and second pointers R1, R2 in the coupling data element 140 the processing unit 21 of the computer system can reconstruct the connection between the first item 101;102;103 and the second item 101;102;103 in both directions.

Figure 4:
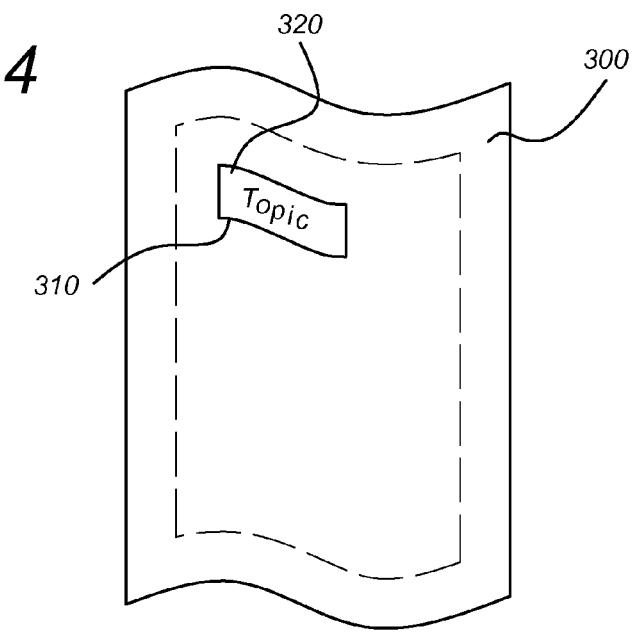
FIG. 4 shows schematically a visualization of an electronic data file in accordance with an embodiment of the invention.

FIG. 4 shows schematically a visualization of an electronic data file in accordance with an embodiment of the invention.

According to an embodiment of the invention, for an electronic data file 300 that has been coupled by a connection with another item, i.e. a reference data object 101, using the data structure 100 as described above, the electronic data file 300 is provided with a referring link 310 that is associated with one connection 320 the electronic data file 300 has with the reference data object 101.

To this end, the processing unit is configured to insert one or more coupling data elements 140 from the data store 100 as a referring link 320 in an electronic data file 300 such a word processing document, a spreadsheet document, a presentation document or a diagramming document, or any other type of document available in the file system.

In this manner the information of the coupling data element 140 becomes available in the electronic data file 300.

The referring link 320 may comprise a connection to a reference data object 101 which hereafter will be referred to as a "topic". In this embodiment, the topic may comprise any type of reference information and can contain any information relevant to the user. As a non-limiting example the topic of the reference data object 101 can be contact information, a name, an address or location, a code, an identification of product, number of a file record, a registration number, etc.

Within the electronic data file 300 (represented here as electronic page) the referring link 310 is represented.

Depending on the type of the electronic data file 300 and the type of application which is capable of processing the electronic data file, the referring link 320 can have various embodiments:

If the electronic data file is a text document and the application is a word processing program, the referring link can be a text item of the text document on a page of the electronic data file.

If the electronic data file is a spreadsheet file and the program is worksheet processing application, then the referring link may be a cell element of the worksheet, on a page of the electronic data file.

If the electronic data file is a diagramming and vector graphics application file and the application can process such a file then the referring link may be a diagram or vector graphics object on a page of the electronic data file.

If the electronic data file is a presentation file and the application is capable of processing such presentation file then the referring link may be a presentation sheet object on a page of the electronic data file.

The present invention provides an extension of the functionality of the application that can process the electronic data file, for example by means of a plug-in application. The plug-in application provides the processing unit with the capability to insert the referring link and to allow user-interaction with the content of the referring link, while executing the application that can process the electronic data file.

For example, a word processing program may be extended by a plug-in that provides functionality in accordance with the invention and obtain capabilities to view properties and/or content of the item coupled to the referring link.

FIG. 5 shows schematically a GUI window displaying the data structure in accordance with an embodiment of the invention.

A GUI window 400 is well known from various operating systems and will not be explained in detail here. According to the invention, the GUI window 400 relates to the file system 220 and represents GUI objects for the file system, i.e. files and folders and connections (and the topics or reference data objects therein). In this manner the GUI window 400 displays a graphic presentation of (part of) the hierarchical file system.

Schematically the GUI window 400 comprises a folder tree part 410 in which a folder tree structure 415 can be displayed to represent the folder structure of the file system. Also, the folder tree part 410 comprises a Topic structure 417 to display the representation of the topics in the data store. This folder tree part 410 of the window is shown here as a left column of the window.

The GUI window 400 comprises a file viewer part 420 in which files and folders can be displayed that are located within a folder that is selected in the folder tree structure 415 in the folder tree part 410. The file viewer part 420 will display topics when a selection is made in the topic structure 417.

The file viewer part 420 can be in an upper right part of the GUI window.

According to an embodiment of the invention, the GUI window 400 comprises a connection information part 430 in which one or more connections can be displayed for a specific file 103, folder 102 or topic 101 that was selected in the file viewer part 420 of the GUI window 400. This connection information part 430 can be in lower right part of the GUI window 400, below the file viewer part 420.

In the connection information part 430 various aspects of the selected connection can be displayed.

In a first view the connection information part 430 is used by the processing unit to display a list of connections as stored in the data store 240 for a selected file 103, folder 102 or topic 101. To this end the processing unit is arranged to retrieve the information on each connection in the list of connections from the data store, and to convert this information into graphical and/or text representations of reference data objects 101 and/or files 103 and/or folders 102 in accordance with the content of each connection.

In a second view the connection information part is used by the processing unit to display a list of topics 101 that are presented by a referring link 320 in a specific file 103 (i.e. a document 300) that has been selected in the file viewer part 420.

For example, one or more topics 101 are each connected with a file 103 (document 300) by means of a respective referring link 320. In that event, when said document 300 is selected, the processing unit is arranged to display a list of the topics 101 connected to the document 300, after retrieval of the associated coupling data elements 140 for these connections from the data store 240 and after the conversion of the retrieved data to displayable information.

In a third view the connection information part 430 is used by the processing unit to display a list of documents 300 in which a specific topic 101 is present. When said specific topic 101 is selected, the processing unit is arranged to display a list of the files 103 (documents 300) to the selected specific topic 101, after retrieval of the associated coupling data elements 140 for these connections from the data store 240 and after the conversion of the retrieved data to displayable information.

It will be understood that the GUI interface 400 may allow user interaction: the processing unit is configured to allow manipulation of the GUI objects such as: creation and deletion of items (topic or file or folder) and "copy" or "move" of such item from one location in the file system to another location. Also the processing unit is configured to allow navigation through the visualization of the data structure 100, using any method known from the art.

According to an embodiment of the invention, the reference data objects 101 or topics can be connected to any file 103 or folder 102 or reference data object 101, and can also be disconnected, i.e., the coupling data element 140 for this connection can be either created in or removed from the data store 240.

It will be appreciated that the content of a reference data object 101 may be modified, edited, changed by the processing unit upon interaction by the user or even upon interaction by a computer generated event.

Also, the skilled person will appreciate that a connection 110, 111, 120, 121, 130, 131 between a first item R1 and a second item R2 as represented by a coupling data element 140 in the data store 240 can be modified by replacing one of the first and second items R1, R2 with a different third item. Such third item can be one selected from a file 103, folder 102 or reference data object 101.

The invention has been described with reference to the embodiments discussed above. It will be recognized that these embodiments are susceptible to various modifications and alternative forms that will be understood by the skilled in the art without departing from the spirit and scope of the invention. Accordingly, although specific embodiments have been described, the described embodiments are presented as examples without a limitation of the scope of the invention.

The invention claimed is:

1. A data structure associated with an hierarchical file system of a computational system, the hierarchical file system comprising a set of files arranged in a directory structure comprising a set of directories, the files having as type word processing document, spreadsheet document, presentation document or a diagramming document, or multi-media file, the data structure comprising:

a data store, the data store comprising a set of reference data objects (topics) and a set of coupling data elements, wherein the set of coupling data elements comprise at least:

one coupling data element for coupling a first item selected from either the set of reference data objects or the set of files or the set of directories with a second other item from either the set of reference data objects or the set of files or the set of directories.

2. The data structure according to claim 1, wherein the coupling data element comprises a first pointer to the first item and a second pointer to the second item.

3. The data structure according to claim 1, wherein the first item is a reference data object selected from the set of reference data objects and the second item is a file selected from the directory structure, or the first item is a reference data object selected from the set of reference data objects and the second item is a directory selected from the set of directories in the directory structure.

4. The data structure according to claim 1, wherein the first item is a reference data object selected from the set of reference data objects, and the second item is another reference data object selected from the set of reference data objects file selected from the directory structure.

5. The data structure according to claim 1, wherein the first item is a file selected from the directory structure, and the second item is another file selected from the directory structure.

6. The data structure according to claim 1, wherein the first item is a directory selected from the directory structure, and the second item is another directory selected from the directory structure.

7. The data structure according to claim 1, wherein the first item is a file selected from the directory structure, and the second item is a directory selected from the directory structure.

8. The data structure according to claim 1, wherein the data store is in the hierarchical file system.

9. The data structure according to claim 1, wherein the data store is remote from the hierarchical file system.

10. The data structure according to claim 1, wherein the computational system is either a single computer or comprises a plurality of networked computers.

11. A method for management of content of an electronic hierarchic file system of a computational system, the hierarchical file system comprising a set of files arranged in a directory structure comprising a set of directories, the files having as type word processing document, spreadsheet document, presentation document or a diagramming document, or multi-media file, the method comprising:

holding in a data store, data comprising a set of one or more reference data objects (topics) and a set of coupling data elements;

coupling a first item selected from either the set of reference data objects or the set of files or the set of directories with a second other item selected from either the set of reference data objects or the set of files or the set of directories; and storing a coupling data element of the first item and the second item in the data store.

12. The method according to claim 11, further comprising: a creation of a reference data object and storing the reference data object in the data store.

13. The method according to claim 11, wherein the coupling data element comprises a first pointer to the first item and a second pointer to the second item.

14. The method according to claim 11, wherein
the first item is a reference data object selected from the set of reference data objects and the second item is a file selected from the directory structure,
or
the first item is a reference data object selected from the set of reference data objects and the second item is a directory selected from the set of directories in the directory structure.

15. The method according to claim 11, wherein the first item is a reference data object selected from the set of reference data objects, and the second item is another reference data object selected from the set of reference data objects file selected from the directory structure.

16. The method according to claim 11, wherein the first item is a file selected from the directory structure, and the second item is another file selected from the directory structure.

17. The method according to claim 11, wherein the first item is a directory selected from the directory structure, and the second item is another directory selected from the directory structure.

18. The method according to claim 11, wherein the first item is a file selected from the directory structure, and the second item is a directory selected from the directory structure.

19. The method according to claim 11, further comprising:
creating displayable information comprising the first item and the second item of at least one coupling data element.

20. The method according to claim 19, wherein the displayable information comprises GUI objects of the first item and the second item that can be displayed on a computer screen using a user interaction interface.

21. The method according to claim 20, further comprising:
a navigation of the file system by selecting either the first or the second item using the user interaction interface.

22. The method according to claim 21, further comprising:
displaying a reference to the second item when the first item is selected in the navigation and comprising displaying a reference to the first item when the second item is selected in the navigation, such that the navigation is bidirectional from the first item to the second item and from the second item to the first item.

23. The method according to claim 20, further comprising:
replacing in the coupling data element either the first or the second item with a third item, the third item being one selected from either the set of reference data objects or the set of files or the set of directories.

24. The method according to claim 20, further comprising:
if the first item or the second item is a reference data object, editing the content of the respective first or second item.

25. The method according to claim 20, further comprising:
if the first item is a reference data object and the second item is a file, embedding a referring link to the first item in the content of the second item.

26. The method according to claim 25, wherein the referring link is a displayable object on a page of the first object.

27. The method according to claim 26, wherein:
the referring link is a text item, if the first object is a text document,
the referring link is a cell element, if the first object is a spreadsheet file,
the referring link is a diagram or vector graphics object, if the first object is a diagramming and vector graphics application file, and
the referring link is a presentation sheet object, if the first object is a presentation file.

28. The method according to claim 20, further comprising:
displaying the GUI objects in a data window of a file browser program, and including displaying a representation of the first item and a representation of the second item.

29. A computer program for execution on a computer system, the computer system comprising a processing unit and memory connected to the processing unit,
the computer system being arranged with an electronic hierarchic file system of a computational system,
the hierarchical file system comprising a set of files arranged in a directory structure comprising a set of directories, the files having as type word processing document, spreadsheet document, presentation document or a diagramming document, or multi-media file,
the computer program consisting of a set of instructions, executable by the processing unit, consisting of a set of instructions, executable by a computer system,
wherein the set of instructions after being loaded in the memory and executed by the processing unit, causes the processing unit to carry out:
holding in a data store, data comprising a set of one or more reference data objects (topics) and a set of coupling data elements;
coupling a first item selected from either the set of reference data objects or the set of files or the set of directories with a second other item from either the set of reference data objects or the set of files or the set of directories; and
storing a coupling data element of the first item and the second item in the data store.

30. The computer program according to claim 29, wherein the computer program is a component of an operating system of the computer system.

31. The computer program according to claim 29, wherein the set of instructions of the computer program is incorporated in the instruction set of a computer application selected from a group comprising a word processing application, a spreadsheet application, a diagramming and vector graphics application, a presentation application and a file browser application.

32. The computer program according to claim 29, wherein the computer program is a functional extension of a computer application selected from a group comprising a word processing application, a spreadsheet application, a diagramming and vector graphics application, a presentation application and a file browser application.

33. A computer readable media comprising a computer program according to claim 29.

* * * * *